United States Patent [19]

Takeichi et al.

[11] Patent Number: 6,008,295
[45] Date of Patent: Dec. 28, 1999

[54] DIENE POLYMERS AND COPOLYMERS INCORPORATING PARTIAL COUPLING AND TERMINALS FORMED FROM HYDROCARBOXYSILANE COMPOUNDS

[75] Inventors: Hideo Takeichi, Akron; Daniel F. Graves, Canal Fulton; Sunil B. Sarkar, Akron; David F. Lawson, Uniontown, all of Ohio

[73] Assignee: Bridgestone Corporation, Tokyo, Japan

[21] Appl. No.: 08/891,570

[22] Filed: Jul. 11, 1997

[51] Int. Cl.$^6$ .......................................... C08F 8/42
[52] U.S. Cl. ................ 525/105; 525/101; 525/332.9; 525/371; 524/506; 524/521; 524/448; 524/449; 524/445; 524/423; 524/424; 524/437
[58] Field of Search ................... 525/105, 332.9, 525/371, 101; 524/506, 521, 448, 449, 445, 423, 426, 424, 437

[56] References Cited

U.S. PATENT DOCUMENTS

| | | | |
|---|---|---|---|
| 3,451,988 | 6/1969 | Langer et al. | 260/94.6 |
| 4,264,753 | 4/1981 | Halasa et al. | 526/180 |
| 4,383,085 | 5/1983 | Fujimaki et al. | 525/196 |
| 4,429,091 | 1/1984 | Hall | 526/181 |
| 4,519,431 | 5/1985 | Yoshimura et al. | 152/209 R |
| 4,526,934 | 7/1985 | Oshima et al. | 525/332.9 |
| 4,603,722 | 8/1986 | Oshima et al. | 152/209 R |
| 5,066,729 | 11/1991 | Stayer, Jr. et al. | 525/315 |
| 5,331,035 | 7/1994 | Hall | 524/457 |
| 5,395,902 | 3/1995 | Hall | 526/201 |
| 5,614,579 | 3/1997 | Roggeman et al. | 524/457 |
| 5,798,419 | 8/1998 | Ruiz Santa Quiteria et al. | 525/370 |

*Primary Examiner*—Margaret Glass Moore
*Attorney, Agent, or Firm*—Frank J. Troy, Sr.

[57] ABSTRACT

Diene polymers or copolymers having improved balance between raw polymer viscosity and mixed compound viscosity, useful in tire tread compositions having highly balanced wet traction, rolling resistance, and traction in ice and snow, and fracture properties in the cured and white carbon reinforced states are provided. These diene polymers or copolymers comprise a mixture of diene polymer or copolymer chains containing carbon-tin bonds in the main polymer or copolymer chains and diene polymer or copolymer chains containing terminals derived from hydrocarboxysilane compounds. The diene polymer or copolymers are prepared by first coupling a portion of the living diene polymer or copolymer chains obtained by anionic polymerization using a tin polyhalide coupling agent and then terminating the remaining living diene polymer or copolymer chains using hydrocarboxysilane compounds. The resultant diene polymers or copolymers have improved balance between raw polymer viscosity and mixed compound viscosity when compounded with silica and/or carbon black and cured compositions are useful in tire tread having highly balanced wet traction, rolling resistance, and traction in ice and snow. The polymers can be utilized to form elastomer compositions for tire treads having balanced properties of reduced rolling resistance and wet traction and handling or balanced properties of wet traction and handling and traction in snow and ice.

38 Claims, 3 Drawing Sheets

DIENE POLYMERS AND COPOLYMERS INCORPORATING PARTIAL COUPLING AND TERMINALS FORMED FROM HYDROCARBOXYSILANE COMPOUNDS

FIELD OF THE INVENTION

The present invention relates to a polymer and a composition using said polymer. More particularly, the present invention relates to a novel functionalized polymer having excellent fracture properties, good abrasion resistance, excellent processability and a novel elastomeric composition for a tire tread using the functionalized polymer wherein the tire tread formed from the composition displays an highly balanced wet traction, rolling resistance ice and snow traction, and fracture property like wear performance.

BACKGROUND OF THE INVENTION

As tires for higher performance are being developed, a rubber having superior fracture properties, good abrasion resistance and low hysteresis loss (low rolling resistance) is desired as the rubber for the tire tread for such tires.

For decreasing the hysteresis loss, cis-1,4-polybutadiene rubber and the like are used. However, the polybutadiene rubber and the like do not have good fracture properties even though they have good abrasion resistance. As a rubber having a remarkably lower hysteresis loss, a solution polymerized butadiene-styrene rubber having the tin-carbon bond in the molecular chain has been developed. However, this rubber does not always have a good balance between wet grip and low rolling resistance.

An elastomeric composition for a tread in which carbon black alone is used as the filler for the rubber described above can realize the desired balance between various properties and performances to some degree. However, simultaneous improvement of wet grip and low rolling resistance to a higher degree has come to be required more urgently in recent years and it is difficult for the rubber described above to satisfy this requirement. In order to solve this problem, there have been disclosed elastomeric compositions in which white carbon such as silica is used alone or in combination with carbon black as the filler. The use of silica in tire tread compositions sometimes improves the balance between wet traction and traction in ice and snow. However, it has been known that diene polymers have low affinity with white carbon such as silica and it is difficult to obtain a homogeneously dispersed rubber composition by milling. To improve this drawback, a large amount of an expensive silane coupling agent is mixed together in many cases. However, since the use of these silane coupling agents in a rubber formulation generates a substantial amount of ethanol in a Banbury mixer, the coupled rubbery mixture may contain undesirable large bubbles that may form blisters or surface defects in the resultant formed articles. Silane coupling agent which is widely used in the rubber industry for this purpose contains free sulfur groups which are undesirable if present in a rubber formulation processed at high mixing temperatures because "scorching" of the rubber may occur. Scorching reduces the processability of the rubber or renders the rubber unusable.

In order to overcome many of these deficiencies the use of an elastomer having a functionality that interacts with silica was proposed. An example of such elastomeric composition is an elastomeric composition containing a polymer modified with an alkoxysilane compound at the end and a silica filler, as displayed in Japanese Patent Publication Showa 52(1977)-5071, Japanese Patent Application Laid-Open Nos. Showa 56(1981)-104906, Showa 62(1987)-50346 and Showa 62(1987)-227908. With these technologies, the physical properties of tires containing the silane modified rubbers, silica and other ingredients could be improved while reducing the necessary amount of the expensive additive Si-69. However, due to the reaction occurring between the silica filler and the hydrocarboxysilanes functionality of the polymers, Mooney viscosities of the resultant compounds were usually too high, thereby creating problems in mixing, in roll milling and in extruding processes. A countermeasure to the high Mooney viscosity was to reduce the molecular weight of the base diene polymer, however this solution created additional problems at the synthetic rubber plant where polymers are made on an industrial scale. These polymers could not be processed by drying to a final rubber bale because of the low molecular weight (Gum Mooney) of the hydrocarboxysilane terminated polymers. Also the raw, low molecular weight diene polymers were susceptible to "cold flow" during storage.

SUMMARY OF THE INVENTION

Thus, the object of the current invention is to provide a polymer composition having a workable molecular weight at synthesis in the polymer plant (e.g. no "hot flow" and "cold flow"), good processability during mixing and the extrusion (tubing) process at the tire plant, satisfying various required properties with a good balance and which is advantageous for practical use.

The present invention displays diene polymers or copolymers formed from a mixture of:

(a) from about 10 to about 70 percent by weight of a diene polymer or copolymer of a diene monomer and a vinyl aromatic hydrocarbon monomer containing carbon-tin bonds in the main polymer or copolymer chain; and (b) from about 90 to about 30 percent by weight of a diene polymer or copolymer of a diene monomer and a vinyl aromatic hydrocarbon monomer containing terminals, formed by reacting living diene polymer or copolymer chains having organoalkali or organoalkaline earth metal terminals with a hydrocarboxysilane compound, such as an alkoxysilane compound, aryloxysilane compound and aralkyloxysilane compound or mixtures thereof.

The diene polymers or copolymers are prepared by a method referred to as primary partial coupling which involves first coupling a portion of the living diene polymer or copolymer chains obtained by anionic polymerization with a tin halide coupling agent and then terminating the remaining living polymer or copolymer chains with a hydrocarboxysilane compound, such as a alkoxysilane compound, aryloxysilane compound and/or aralkyloxysilane compound.

Elastomer compositions of the invention may contain: (a) from 20 to 100 percent by weight of said diene polymers or copolymers and (b) from 0 to 80 percent by weight of a rubber selected from the group consisting of natural rubber, polybutadiene rubber, styrene-butadiene rubber and mixtures thereof.

Accordingly, an object of the present invention is to provide a novel functionalized polymer having improved balance between raw polymer viscosity and mixed compound viscosity, useful in tire tread compositions having highly balanced wet traction, rolling resistance, traction in ice and snow, and fracture properties in the cured and white carbon reinforced states. To this end, the functionalized polymer of the present invention comprises a diene-type polymer having a portion of the diene-type polymer tin-coupled and having a portion of the diene-type polymer having terminal hydrocarboxysilane groups.

The elastomeric composition of the present invention comprises a rubber material containing a functionalized polymer in an amount of 10 or more parts by weight in 100 parts by weight of the rubber material, and a filler of 10 to 100 parts by weight based on 100 parts by weight of the rubber material, wherein the filler contains a white carbon, and the functionalized polymer comprises a diene-type polymer having a portion of the diene-type polymer tin-coupled and having a portion of the diene-type polymer having a hydrocarboxysilane group, such as an alkoxysilane group, an aryloxysilane group, or an aralkyloxysilane group.

DETAILED DESCRIPTION OF THE INVENTION

Figure 1:
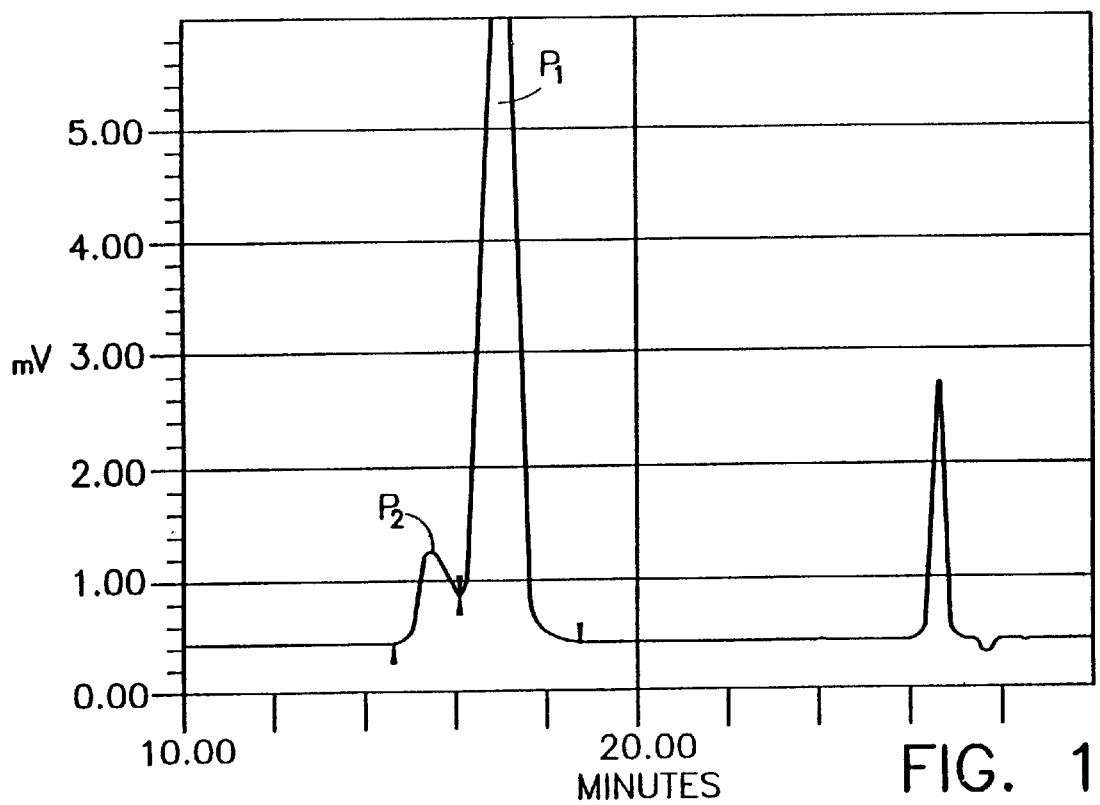
FIG. 1 is a graph showing the GPC curve which illustrates the molecular weight distribution of the polymer of Example 1 before coupling or adding silane functionality.

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g. lithium terminals) which can be subjected to coupling and/or terminating reactions. The term "hysteresis" as employed throughout the specification refers to the heat generating properties of a vulcanized elastomer or rubber composition. An art recognized measurement of the hysteresis of an elastomer composition is the tan delta value of the vulcanized composition. Low tan delta values at 50° to 65° C. are indicative of low hysteresis and, consequently, tires formed from such elastomer compositions have lower rolling resistance.

The diene polymers or copolymers of the invention are prepared by a process which involves first preparing a living diene polymer or copolymer containing active organoalkali or organoalkaline earth metal terminals by anionic polymerization of a conjugated diene monomer or mixture of a conjugated diene monomer and a vinyl aromatic hydrocarbon monomer, coupling a portion of the living diene polymer or copolymer chains by reacting the active terminals thereof with a tin polyhalide and then terminating the remaining portion of the living diene polymer or copolymer chains by reacting the active terminals thereof with a hydrocarboxysilane compound such as an alkoxysilane compound, aryloxysilane compound and/or aralkyloxysilane compound. It is preferable that greater than 50%, most preferably 80 to 100%, of the living ends of the remaining portion of the living diene polymer or copolymer chains be terminated by reacting the active terminals thereof with a hydrocarboxysilane compound. The remaining living ends may be terminated by methods well known to those skilled in the art such as with other known coupling agents, terminators, modifiers and quenching techniques.

The living diene polymer is a polymer of a conjugated diene and the living diene copolymer is a copolymer of a conjugated diene and a vinyl aromatic hydrocarbon. As the conjugated diene polymer, polybutadiene having excellent abrasion resistance is preferable. As the conjugated diene/vinyl aromatic hydrocarbon copolymer, butadiene/styrene copolymers having excellent abrasion resistance and aging resistance are preferable. The microstructure of the butadiene part (cis-1,4, trans-1,4, and vinyl) in the diene-type polymer, such as polybutadiene and butadiene/styrene copolymer, is not particularly limited, but can be in a range generally obtained by using an organolithium initiator. Composition of the conjugated diene/vinyl aromatic hydrocarbon copolymer, such as butadiene/styrene copolymer, is not particularly limited, but the ratio by weight of the conjugate diene unit to the vinyl aromatic hydrocarbon unit is generally 99/1 to 20/80. The distribution of the units in the copolymer may be a random distribution, a block distribution, or an intermediate distribution of these distributions. A random distribution and an intermediate distribution are generally preferable.

Conjugated dienes which may be utilized in preparing the living polymers and copolymers include 1,3-butadiene, 2-methyl-1,3-butadiene (isoprene), 2,3-dimethyl-1,3-butadiene, 1,3-pentadiene, 1,3-hexadiene and the like as well as mixtures thereof. The preferred diene is 1,3-butadiene.

Vinyl aromatic hydrocarbons which may be utilized in preparing the living copolymers include styrene, vinyl toluene, alpha-methyl styrene, vinyl naphthalene, divinyl benzene, vinyl pyridine and the like. The preferred vinyl aromatic hydrocarbon is styrene.

The living polymer can be prepared in a well known manner by polymerizing the monomer or monomers in a hydrocarbon solvent in the presence of an anionic initiator. The process of the present invention may be conducted in "batch", "semi-batch", "continuous" or "dispersion" polymerization processes. The examples in this application were conducted in a "batch" process, that is, with essentially one charge into a reactor until the reaction is completed. In a "semi-batch" process, new monomer charges are periodically added by a metering method into the polymerization reaction as the polymerization proceeds. In a "continuous" process, initiator and monomer are continuously charged into a reactor. In a "dispersion" process, polymerization is conducted in a state of suspension as described in U.S. Pat. Nos. 5,331,035; 5,395,902; and 5,614,579.

In instances where it is desired to control the 1,2-microstructure of the diene polymer or copolymer and to effect randomization of the copolymer, this can readily be accomplished by including an appropriate polar modifier such as an ether or a tertiary amine in the polymerization mixture.

Anionic initiators which may be utilized in the preparation of the living polymers and copolymers may be any of the organoalkali metal initiators known in the art to be useful for the preparation of diene polymers and copolymers. The preferred initiators are organolithium initiators, especially the alkyllithium initiators. Examples of the lithium compound used include alkyllithiums, such as ethyllithium, propyl lithium, n-butyl lithium, sec-butyl lithium, tert-butyl lithium, hexyl lithium, and the like; alkylene dilithium, such as 1,4-dilithiobutane, and the like; phenyl lithium; stilbene dilithium; other hydrocarbon lithiums, such as reaction products of butyl lithium and divinylbenzene, and the like; organometallic lithiums, such as tributyltin lithium, and the like; and lithium amides, such as lithium diethylamide, lithium diisopropylamide, lithium piperidide, and the like. Among these lithium compounds, n-butyl lithium and sec-butyl lithium are preferable. The lithium compound may be used singly or as a mixture of two or more types. The lithium compound can be used in an amount in the range of 0.2 to 30 mmol per 100 g of the monomer. The molecular weight of the polymer can easily be controlled by adjusting the concentration of the lithium compound.

It is also possible to employ as the anionic initiator an initiator formed by reacting a functionalizing agent with the above-described organolithium initiators. Thus, such initiators can be formed by reacting a functionalizing agent selected from the group consisting of substituted aldimines, ketimines and secondary amines with the organolithium compound. For example, an anionic initiator of this type can be formed by reacting a substituted aldimine such as dimethylamino benzylidene methylamine with n-butyl lithium. A number of initiators of this type are described in our U.S. Pat. No. 5,066,729, the disclosure of which is incorporated herein by reference.

Hydrocarbon solvents which may be employed in the preparation of the living polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and cyclohexane.

Polar modifiers which may be utilized to control the 1,2-microstructure content of the living diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis (2-oxolanyl) methane; 2,2-bis (2-oxolanyl) propane; 1,1-bis (2-oxolanyl) ethane; 2,2-bis (5-methyl-2-oxolanyl) propane and the like and tertiary amine compounds such as triethyl amine, tripropyl amine, tributyl amine, N,N,N',N'-tetramethylethylene diamine (TMEDA), dipiperidino ethane, and the like. The preferred polar modifiers are TMEDA and the oligomeric oxolanyl propanes.

The living copolymers of conjugated dienes and vinyl aromatic hydrocarbons utilized to prepare copolymers of the present invention may have diene contents of from about 99 to 20 percent by weight and vinyl aromatic hydrocarbon contents of from about 1 to about 80 percent by weight with the preferred copolymers having diene contents of from 95 to 50 percent by weight and vinyl aromatic hydrocarbon contents of from 5 to 50 percent by weight.

The living polymers of conjugated dienes and copolymers of conjugated dienes and vinyl aromatic hydrocarbons employed to prepare the polymers and copolymers of the invention may have 1,2-microstructure contents ranging from about 6 to about 80 percent with the preferred polymers or copolymers having 1,2-microstructure contents of from 15 to 65 percent. The preparation of diene polymers or copolymers having a particular 1,2-microstructure content is dependent on a number of factors including the specific initiator, the type polar modifier, the modifier to initiator ratio and the polymerization temperature.

Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerizations and Copolymerization", Journal of Polymer Science, Part A-1, Vol. 10, pages 1319–1334 (1972); the disclosures of which are incorporated herein by reference.

One of ordinary skill in the polymerization arts can, by utilizing the disclosures of the incorporated patents and publication, readily determine the type initiator, the type polar modifier, the necessary modifier-initiator ratio and polymerization conditions necessary to obtain a living diene polymer or copolymer having the desired 1,2-microstructure content. Aftter the conversion of charged mononmers to polymers reaches over 80 to 90%, a small amount of a diene monomer, such as butadiene or isoprene, may be added to the polymerization system to convert the living polymer end into butadienyl-lithium (with the use of butadiene) to facilitate the following reaction with a tin polyhalide while improving the physical properties of the final product. This technique is described in U.S. Pat. Nos. 4,383,085; 4,519,431; 4,526,934; and 4,603,722. The diene polymers or copolymers containing carbon-tin bonds in the main polymer or copolymer chains are prepared by coupling the desired amount of living diene polymer or copolymer chains by reacting the alkali or alkaline earth metal terminals thereof with a tin polyhalide having the formula $R_aSnX_b$, wherein R is selected from the group consisting of alkyl, alkenyl, cyloalkyl and aryl groups, X is a halogen atom, a is an integer of 0–2 and b is an integer of 2–4.

Illustrative examples of tin polyhalides which may be employed include methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyltrichlorotin, phenyl trichlorotin, 1,2-bis (trichlorostannyl) ethane, 1,2-bis (methyldichlorostannyl) ethane, 1,4-bis (trichlorostannyl) butane, 1,4-bis (methyldichlorostannyl) butane and the like. The preferred tin polyhalides are tin tetrachloride and dibutyldichlorotin.

The coupling reaction is conducted by reacting the living polymers, preferably in solution in the hydrocarbon solvent in which they were prepared, with the tin polyhalide coupling agent. The reaction can be carried out if desired by simply adding the coupling agent per se to the polymer solution. However, it is generally preferred to add the coupling agent in the form of a solution thereof in an appropriate solvent for ease of handling.

The amounts of coupling agent added to the living polymer are dependent upon the amounts of live organoalkali metal end groups (e.g. live lithium end groups) present in the living polymer and the amount of coupled polymer desired in the finished polymer composition. It should be noted that the number of moles of live alkali metal end groups in the living polymer is presumed to be equivalent to the number of moles of alkali metal groups present in the organoalkali metal initiator utilized to effect polymerization. In general, the amount of tin polyhalide coupling agent employed to react with the live alkali metal end groups of the living polymer chains may range from about 0.1 to about 0.8 equivalents of tin polyhalide, based on the number of halogen atoms in said tin polyhalide, per mole of living polymer chains. However, preferred amounts of tin polyhalide range from 0.1 to 0.6 equivalents with 0.15 to 0.50 equivalents being especially preferred.

Temperatures employed in coupling the living polymer chains with the coupling agent may vary considerably and are selected with the basic criteria of preserving the live alkali metal end groups of the living polymer chains for reaction with the coupling agent and, subsequently, the terminating agent. Thus, the reaction temperatures may range from about 0° C. to about 100° C. with preferred temperatures ranging from 30° C. to 100° C. and especially preferred temperatures ranging from 50° C. to 80° C. The reaction times may also vary somewhat and are, in general, dependent upon reaction temperatures. Hence, the reaction times may range from about 0.5 minutes to about 60 minutes with preferred reaction times ranging from 1 to 30 minutes.

The diene polymers or copolymers containing terminals derived from a hydrocarbyloxysilane compounds are prepared by reacting the remaining living polymer or copolymer chains, preferably in solution, with a terminating agent such as a hydrocarbyloxysilane compound. Hydrocarboxysilane compounds which may be employed include alkoxysilane compound, aryloxysilane compound and/or aralkyloxysilane compound used in the preparation of the functionalized polymer represented by the formula (1):

(1)

wherein $R^3$ and $R^4$ in formula (1) represent a group selected from an aliphatic hydrocarbon group, an alicyclic hydrocarbon group, or an aromatic hydrocarbon group, each having 20 or less, preferably 10 or less, carbon atoms, and y represents an integer of 1 to 4, and $R^4$ may be a halo group including chloro. Examples of the aliphatic hydrocarbon group include methyl group, ethyl group, propyl group, butyl group, pentyl group, hexyl group, octyl group, and the like. Examples of the alicyclic hydrocarbon group include cyclopentyl group, cyclohexyl group, cycloheptyl group, and the like. Examples of the aromatic hydrocarbon group include phenyl group, naphthyl group, biphenyl group, anthryl group, phenanthryl group, and the like. $R^3$ is preferably an aliphatic hydrocarbon group or an aromatic hydrocarbon group, each having 10 or less carbon atoms. $R^3$ and $R^4$ are each most preferably methyl group, ethyl group, propyl group, or phenyl group. $R^4$ is not present in the functionalized polymer when the number of $OR^3$ bonded to silicon have some specified values [i.e., when y=4 in formula (1)].

In formula (1), y represents an integer of 1 to 4. The functionalized polymer may be a single compound having fixed values of y in formula (1) or a mixture of compounds having various values of y in formula (1).

The alkoxysilane compound, aryloxysilane compound and/or aralkyloxysilane compound are not particularly limited and a substituted or unsubstituted tetraalkoxysilane compound, an alkylalkoxysilane compound, an arylalkoxysilane compound, an alkenylalkoxysilane compound, a halogenoalkoxysilane compound, or the like can be used. In the present description an alkoxy group, an aryloxy group, and an aralkyloxy group are those in which the hydrocarbon group replacing the hydrogen atom of the hydroxyl group is an aliphatic hydrocarbon group, an aromatic hydrocarbon group, and an aralkyl hydrocarbon group, respectively.

Examples of the tetraalkoxysilane compound described above include tetramethoxysilane, tetraethoxysilane, tetra-n-propoxysilane, tetra-n-butoxysilane, tetra(2-ethylhexanoxy)silane, tetraphenoxysilane, tetratoluyloxysilane, and the like.

Examples of the alkylalkoxysilane compound described above include methyltrimethoxysilane, methyltriethoxysilane, methyltri-n-propoxysilane, methyltri-n-butoxysilane, methyltriphenoxysilane, ethyltrimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane (GPMOS), γ-methacryloxy propyl trimethoxysilane and the like.

Examples of the arylalkoxysilane compound described above include phenyltrimethoxysilane, phenyltriethoxysilane, phenyltri-n-propoxysilane, phenyltri-n-butoxysilane, phenyltriphenoxysilane, and the like.

Examples of the alkenylalkoxysilane compound described above include vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, styryltrimethoxysilane, and the like.

Examples of the halogenoalkoxysilane compound described above include trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, and the like.

Other useful silanes include bis(trimethoxysilane)-ether, Si-69 (Bis-(3-{triethoxysilyl}-propyl)-tetrasulfide) and the like.

The reaction of the living polymer in solution with the terminating agent can be conducted if desired by simply adding the terminating agent per se to the polymer solution. However, it is generally preferred to add the terminating agent in the form of a solution thereof in an appropriate solvent for ease of handling. The terminating agent may be added simultaneously with the tin polyhalide coupling agent or after the tin polyhalide coupling agent. The terminating agent should not be added prior to the addition of the Sn coupling agent.

The amounts of terminating agent added to the living polymer are dependent upon the amounts of live organoalkali metal end groups (e.g. live lithium end groups) present in the living polymer and the amounts of terminated polymer desired in the finished polymer composition. It will be noted that the number of moles of live alkali metal end groups in the living polymer is presumed to be equivalent to the number of moles of alkali metal groups present in the organoalkali metal initiator utilized to effect polymerization assuming that the impurities in the system is low enough. In general, the amount of terminating agent employed to react with the live alkali metal groups of the living polymer chains may range from about 0.3 to about 100 moles of said terminating agent per mole of living polymer chains. However, the preferred amounts range from 0.4 to 2.0 moles of such terminating agent per mole of living polymer chains.

Temperatures employed in reacting the living polymer with the terminating agent may vary considerably and are selected with the basic criteria of preserving the live alkali metal end groups of the living polymer for reaction with the terminating agents. Thus, the reaction temperatures may range from about 0° C. to about 100° C. with the preferred temperatures ranging from 30° C. to 100° C. and especially preferred temperatures ranging from 50° C. to 80° C. The reaction times may also vary considerably and are, in general, dependent upon reaction temperatures. Hence, the reaction times may range from about 15 minutes to about 24 hours.

After the terminating reaction is complete, it is desirable to neutralize the polymer cement to prevent the reaction between two or more functional ends of the polymer during work-up. Neutralizing agents include acids such as 2-ethylhexanoic acid or benzoic chloride.

The resultant diene polymer or copolymer which contains a mixture of polymer containing carbon-tin bonds and polymer containing terminals derived from hydrocarboxylsilane compounds may be recovered from the polymer solution and dried using conventional procedures. Thus, for example, the polymer mixture can be recovered from solution by direct drum drying, extruder drying, air drying or by coagulation either by adding a sufficient volume of a nonsolvent liquid (e.g. an alcohol) for the polymer to the solution or, alternatively, by adding the polymer solution to a sufficient volume of the non-solvent. It is usually desirable in carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

The diene polymers or copolymers of the invention may contain from about 10 to about 80 percent by weight of polymer or copolymer containing carbon-tin bonds and correspondingly from about 90 to about 20 percent by weight of polymer or copolymer containing terminals derived from hydrocarbonyloxylsilane compounds. However, the preferred compositions are those containing from about 15 to about 50 percent by weight of polymer or copolymer containing carbon-tin bonds and from about 50 to about 85 percent by weight of polymer or copolymer containing terminals derived from hydrocarbonyloxylsilane compounds.

It should be noted here that during the polymerization of the monomer(s) to prepare the living diene polymer or copolymers a minor proportion of living ends may be terminated with hydrogen or by loss of lithium hydride particularly in instances where the polymerization is conducted at high temperatures. Hence, the polymer compositions may contain minor proportions of such terminated polymers in addition to the diene polymers or copolymers of the invention.

As indicated, the elastomer compositions of the invention may contain (A) from 20 to 100 percent by weight of diene polymer or copolymer mixture consisting of diene polymer or copolymer containing carbon-tin bonds and diene polymer or copolymer containing terminals derived from hydrocarbonyloxylsilane compounds and (B) from 0 to 80 percent by weight of a rubber selected from the group consisting of natural rubber, polyisoprene, polybutadiene rubber, styrene-butadiene rubber or mixtures thereof. Such compositions can be prepared by compounding or mixing said diene polymer of copolymer composition component optionally with the other rubber component along with white carbon like silica, carbon black and other conventional rubber additives such as fillers, plasticizers, antioxidants, curing agents and the like using standard rubber mixing equipment and procedures. Such elastomer compositions when vulcanized using conventional rubber vulcanization conditions have highly balanced wet traction, rolling resistance, ice and snow traction, and fracture property like wear performance.

Fillers are used in the elastomeric compositions of the present invention. White carbon or equivalent fillers are the essential component of the filler. Examples of the white carbon used in the elastomeric composition of the present invention include wet silica (hydrated silicic acid), dry silica (anhydrous silicic acid), or calcium silicate, Other equivalent useful fillers include: aluminum silicate, clay, talc, calcium carbonate, basic magnesium carbonate, hydrated alumina, diatomaceous earth, barium sulfate, mica, aluminum sulfate, titanium oxide, aluminum hydroxide, aluminum oxide and the like. Among these white carbons, wet silica is preferable because it can highly balance wet traction, rolling resistance, ice and snow traction, and fracture properties.

The content of the filler in the elastomeric composition is 10 to 150 parts by weight, preferably 20 to 90 parts by weight, based on 100 parts by weight of the total elastomeric rubbery material, that is the combination of the functionalized polymer and additional rubber if present. When the content is less than 10 parts by weight, the fracture properties are insufficient. When the content is more than 150 parts by weight, processability is inferior.

The filler of the present invention may contain the white carbon alone. In this case, the content of the white carbon in the elastomeric composition is 10 to 150 parts by weight, preferably 20 to 90 parts by weight, based on 100 parts by weight of the rubber material. When the content is less than 10 parts by weight, the fracture properties are insufficient. When the content is more than 150 parts by weight, processability is inferior.

The filler of the present invention may contain the white carbon and carbon black in combination. The effect of the filler on the improvement of the physical properties is remarkably enhanced by this combination. As the carbon black, FEF, SRF, HAF, ISAF, SAF, and the like, are used. Carbon blacks having an iodine adsorption number (IA) of 60 mg or more per g, and a dibutyl phthalate absorption number (DBP) of 80 ml or more per 100 g, are preferably used. HAF, ISAF and SAF having superior abrasion resistance are particularly preferable. The amount of the carbon black used is not particularly limited as long as it is within such a range that the effect of the white carbon is not adversely affected. From the standpoints of the reinforcing property and processability, it is preferred that 0 to 100 parts by weight of the carbon black and 0 to 150 parts by weight of the white carbon, each based on 100 parts by weight of the rubber material, are used as long as the content of the filler is within the range described above.

In the elastomeric composition of the present invention, the hydrocaboxysilane terminating agent, such as Si-69, is used in the preparation of the elastomeric composition for the purpose of further enhancing the reinforcement with the white carbon.

Examples of the vulcanizing agent include sulfur and the like. The amount of the vulcanizing agent used is 0.1 to 5 parts by weight, preferably 1 to 3 parts by weight, based on 100 parts by weight of the rubber material. When the amount is less than 0.1 parts by weight, the fracture properties, abrasion resistance, and low hysteresis loss of the vulcanized rubber are inferior. When the amount is more than 5 parts by weight, the rubber elasticity is lost.

Examples of the process oil which can be used in the elastomeric composition of the present invention include paraffinic process oils, naphthenic process oils, and aromatic process oils. For applications in which tensile strength and abrasion resistance are important, aromatic process oils are used. For applications in which hysteresis loss and low temperature properties are important, naphthenic process oils and paraffinic process oils are used. The amount of the process oil used is 0 to 100 parts by weight based on 100 parts by weight of the rubber material. When the amount is more than 100 parts by weight, tensile strength and low hysteresis loss of the vulcanized rubber deteriorate significantly.

Vulcanization accelerators used in the present invention are not particularly limited. Examples of the vulcanization accelerator include thiazol vulcanization accelerators, such as M (2-mercaptobenzothiazol), DM (dibenzothiazyl disulfide), CZ (N-cyclohexyl-2-benzothiazyl-sulfenamide) and the like; and guanidine vulcanization accelerators, such as DPG (diphenylguanidine) and the like. The amount of the vulcanization accelerator used is 0.1 to 5 parts by weight, preferably 0.2 to 3 parts by weight, based on 100 parts by weight of the rubber material.

In the elastomeric composition of the present invention, additives, such as antioxidants, zinc oxide, stearic acid, antiozonants, and the like which are conventionally used in the rubber industry may be utilized.

The elastomeric composition of the present invention can be obtained by milling the components by using a milling apparatus, such as a mill, an internal mixer, and the like. In the mixing of the hydrocarboxysilane terminated polymer and the silica filler, it is important to conduct the mixing for a sufficient time and at a high enough temperature to ensure the compounding reaction of the silane functional end of the polymer with the silica. Actual compounding temperatures should be in the range of 140° to 190° C. After being molded and vulcanized, the elastomeric composition may be applied to tires, such as tire treads, undertreads, carcasses, side walls, beads, and the like, as well as to other industrial rubbers, such as antivibration rubbers, belts, hoses, Rubber Crawlers, shoes and the like. The elastomeric composition is particularly preferably used as a rubber for tire treads.

To summarize the advantages of the present invention, the functionalized polymers and the compounded elastomeric compositions of the present invention exhibit good work-up processability at the synthetic rubber plant; low compound viscosity and good mixing, roll mill, and extrusion processabilities at the tire plant; excellent fracture properties; abrasion resistance; and low hysteresis loss (low rolling resistance and low fuel consumption) properties as a cured tire because the functionalized polymer and the elastomeric composition have the structure and the composition described above.

In the following examples, part and % mean part by weight and % by weight, respectively, unless otherwise mentioned. The Mooney viscosity (ML1+4@130° C.) of the elastomeric composition was measured in accordance with the method of Japanese Industrial Standard K6300 at 130° C. As the index for hysteresis loss and rolling resistance of a vulcanizate of the elastomeric composition, tan delta (50° C.) was used. An elastomeric composition having a smaller tan delta was evaluated as having a lower hysteresis loss and a lower rolling resistance. Measurement of tan delta (50° C.) was conducted by using a viscoelasticity measurement apparatus (Dynastat) at a temperature of 50° C. and a frequency of 1 Hz. Measurement of tan delta (0° C.) as the index for the wet grip was conducted by using the same apparatus at a temperature of 0° C. and a frequency of 1 Hz.

Fracture properties and 300% modulus (M300) were measured in accordance with the method of Japanese Industrial Standard K6301. Abrasion resistance was measured by using a Lambourn abrasion tester at room temperature with a slip rate of 65%. The rolling resistance, wet traction, dry traction and wear of the tires formed in the following examples were measured by standard techniques versus a standard tire filled with Si-69 (Comparative Example 8).

The following examples are submitted for the purpose of further illustrating the nature of the present invention and should not be regarded as a limitation on the scope thereof.

Preparation of N-Lithiohexamethyleneimine Initiator Solution in Cyclohexane

Hexamethyleneimine was distilled from calcium hydride and transferred under nitrogen to a dried, nitrogen-purged bottle. The N-lithio salt of hexamethylene imine was prepared by treating 30 mequiv. of a 2.24 M solution of the cyclic amine in 85:15 cyclohexane:hexane with 30 mequiv. of a 1.67 M solution of n-butyllithium, swirling the mixture at room temperature overnight. The resulting solution was a clear, pale yellow. The solution was stable for several days at room temperature. Samples were drawn from it by syringe for use in initiating polymerization.

The following examples display the preparation of polymers from amino-containing initiators under various conditions.

Polymerization Procedures Conducted in Bottles

An initiator mixture made in the above manner was transferred by syringe to a 28-oz. bottle, containing a blend of butadiene/styrene at 10–25% (w/w) in hexane, at a level of 0.5–1.2 meq Li/100 g monomer, and also in the presence of an effective amount of polar modifier (for example, 0.6 mol of N,N,N',N'-tetramethylethylene diamine (TMEDA) per mol of lithium). Optionally, a small amount of an alkoxide salt of Na or K was also added, to modify the sequence distribution of the styrene (for example, 0.05 mol of potassium t-amylate (as a solution in cyclohexane) per mol of lithium). In such a case, a reduced amount of polar modifier was used (for example, 0.15 moles of TMEDA, or 0.06 moles of an oligomeric oxolanyl propane, per mole of lithium). The initiator mixture may optionally be prepared in situ in the presence of the monomers by adding an equivalent or slightly deficient amount of purified secondary amine (e.g, about 0.4–1 mole of amine per mole of alkyllithium). The mixture was agitated at room temperature to 80° C. for 15 min to 16 hr, with the polymerization proceeding at a conversion rate of greater than 90% of monomer to polymer. The contents of the bottle containing living polymer cement was then treated with a hexane solution of $SnCl_4$ for an additional 0–30 min at 30–80° C. at a total level of 0.15 to 0.35 moles of Cl per mole of Li. The polymer cement which includes Sn coupled polymer and living cement was treated with a hexane solution of tetraethoxysilane (TEOS) for an additional 20–90 min at 30–80° C. at a level of 0.5–0.7 moles of Si per mole of Li. The cement was then quenched with 2-ethylhexanoic acid(EHA) at a level of 0.5–2.0 moles per mole of Li and a small amount of antioxidant, for example, with 3 ml of a mixture containing 7.0 wt % DBPC, coagulated in i-PrOH, then drum-dried.

Procedure for the Preparation of Polymers A to E and Comparative Polymers F to I Used in Examples 1 to 8 and Comparative Examples 1 to 9

The same general polymerization procedure was followed to prepare nine polymers (A to I) except where noted below. In each of nine runs, a dried, stainless-steel, 100 gallon reactor, under a nitrogen atmosphere, was charged with 285 lbs. of hexane, 215 lbs. of a blend of 33% by weight styrene in hexane, and 84 lbs. of a blend of 31% by weight butadiene in hexane. Butyl lithium was charged at a level of 0.947 mmol/100 g of monomer in the preparation of polymer cements A, B, C, D, E, F, G and I and in a slightly lower amount in the preparation of polymer cement H, followed by a charge of 0.85 mmol of hexamethyleneimine, and 0.19 mmol of 2,2-bis(2-oxolanyl)propane as a polar modifier. The polymerization mixture was agitated and heated from 30° C. to about 80±10° C. for a period of from 0.4 to 2 hr, depending on temperature, with the polymerization proceeding at a conversion rate of greater than 90% conversion of monomer to polymer. Polymerization at temperatures above 90° C. should be avoided. After an additional 9.1 lbs of the 31% butadiene/hexane blend was added to the reactors containing polymer cements A, B, C and D, these mixtures were treated with a hexane solution of SnCl$_4$ for 15 minutes then with a hexane solution of alkoxysilane (TEOS) for an additional 15–120 minutes. Polymer cement E was simultaneously treated with a hexane solution of SnCl$_4$ and a hexane solution of alkoxysilane(TEOS) for 90 minutes. Comparative polymer cement F was not treated with a hexane solution of SnCl$_4$ but was terminated only with a hexane solution of alkoxysilane (TEOS) for 90 minutes. Comparative polymer cements G and H were treated after the 9.1 lb addition of 31% butadiene/hexane blend with a hexane solution of SnCl$_4$ for 15–90 minutes but were not treated with a hexane solution of alkoxysilane (TEOS). Comparative polymer cement I was terminated with a hexane solution of alkoxysilane(TEOS) for 30 minutes at 50–80° C. prior to treatment with a hexane solution of SnCl$_4$. After production all cements A–I were then transferred and treated with 2-ethylhexanoic acid (EHA) (except for polymer cements G and H), and an antioxidant, and coagulated in i-PrOH, then drum-dried. Polymers A to I were formed from cements A to I, respectively. Polymer J, used in Comparative Example No. 8 was a butyl lithium initiated, SnCl$_4$ terminated SBR (20% styrene, 60% vinyl and 90 Gum Mooney control polymer). Polymers A to E represent polymers formed according to the process of the present invention and Polymers F to J were prepared for comparative evaluation.

Ratios of these SnCl$_4$ and alkoxysilane(TEOS) reactants used in modifying the polymers produced by this process are displayed in Tables 2A, 2B and 3. Table 1 summarizes compounding formulations AA and BB used for tire compositions in which the SBR is the tin-coupled and/or siloxane functionalized polymer produced in the cements A–I. Formulations AA and BB employ either a silica filler having a small portion of carbon black(HAF) or a mixture of carbon black and silica at a weight ratio of 54/46. Examples 1 to 5 in Table 2A display the use of Polymers A to E, respectively, in formulation BB having a mixture of carbon black and silica at a weight ratio of 54/46. Comparative Examples 1 to 4 in Table 2B displays the use of comparative Polymers F to I in formulation BB having a mixture of carbon black and silica at a weight ratio of 54/46. Suitable characterizations and evaluations including compound properties of the resultant formulations were then performed and are also displayed in Tables 2A and 2B. Examples 6 and 7 in Table 3 display the use of Polymers A and D, respectively, in formulation AA, having a mixture of a lower amount of carbon black, with silica and Si-69. Comparative Examples 5, 6 and 7 in Table 3 likewise display the use of comparative Polymers F, G and H, respectively, in formulation AA. Suitable characterizations and evaluations including compound properties of the resultant formulations were then performed and are also displayed in Table 3.

Table 4 displays examples of tire test data using tread compound having a carbon black to silica ratio of 54 to 46 using formulation BB from Table 1. Example 8 in Table 4 displays the use of Polymer D in formulation BB having a mixture of carbon black and silica at a weight ratio of 54/46 and its use in a tire tread. Comparative Examples 8 and 9 in Table 4 displays the use of comparative Polymers J and F in formulation BB having a mixture of carbon black and silica at a weight ratio of 54/46 and compare their use in a tire tread. Suitable characterizations and evaluations of their use in tire treads as shown in Table 4.

TABLE 1

| Formulation | AA pbw | BB pbw |
|---|---|---|
| SBR | 75 | 75 |
| Natural Rubber | 25 | 25 |
| Silica | 60 | 30 |
| Carbon Black* | 6 | 35 |
| Oil | 19 | 22.5 |
| Anti-oxidant | 0.95 | 0.95 |
| Stearic Acid | 1–5 | 1.5 |
| Si-69 | 2 | 0 |
| Cure Package | 5.25 | 5.25 |
| Sulfur | 3.0~3.6 | 2.5~3.0 |

*HAF

TABLE 2A

Carbon Black/Silica = 54/46 in Formulation BB

| Example No. | 1 | 2 | 3 | 4 | 5 |
|---|---|---|---|---|---|
| Polymer Used | A | B | C | D | E |
| Coupler | SnCl$_4$* | SnCl$_4$* | SnCl$_4$* | SnCl$_4$* | SnCl$_4$** |
| Terminator | TEOS | TEOS | TEOS | TEOS | TEOS |
| Sn/Si | 30/70 | 15/85 | 25/75 | 5/65 | 30/70 |
| Cl***/Li | 0.3 | 0.15 | 0.25 | 0.35 | 0.3 |
| Si****/Li | 0.5 | 0.68 | 0.6 | 0.61 | 0.5 |
| EHA/Li Ratio | 1 | 1 | 1 | 1 | 1 |
| Gum ML1 + 4 100° C. | 61 | 62 | 63 | 53 | 48 |
| Compound Properties | | | | | |
| Compound ML1 + 4$^a$ | 68 | 68 | 67 | 58 | 72 |
| 50° C. tan delta | 0.121 | 0.121 | 0.108 | 0.109 | 0.098 |
| 0° C. tan delta | 0.227 | 0.215 | 0.212 | 0.185 | 0.224 |
| M300 | 1710 | 1860 | 1620 | 1810 | 2150 |
| T$_b$ (psi) | 2430 | 3090 | 2540 | 2900 | 3010 |
| E$_b$ (%) | 392 | 433 | 422 | 426 | 388 |
| Lambourn 65% slip | 101 | 107 | 104 | 104 | 103 |

*Added before TEOS
**Added simultanuously

TABLE 2A-continued

Carbon Black/Silica = 54/46 in Formulation BB

| Example No. | 1 | 2 | 3 | 4 | 5 |
|---|---|---|---|---|---|

***Of SnCl$_4$
****Of TEOS
$^a$at 130° C.

TABLE 2B

Carbon Black/Silica = 54/46 in Formulation BB

| Comparative Example No. | 1 | 2 | 3 | 4 |
|---|---|---|---|---|
| Polymer Used | F | G | H | I |
| Coupler | None | SnCl$_4$ | SnCl$_4$ | TEOS$^a$/SnCl$_4$ |
| Terminator | TEOS | None | None | TEOS |
| Sn/Si | 0/100 | 100/0 | 100/0 | 30/70 |
| Cl***/Li | — | 0.8 | 0.8 | 0.3 |
| Si****/Li | 0.6 | — | — | 0.5 |
| EHA/Li (Mole) | 1 | — | — | 1 |
| Gum ML1 + 4@ 100° C. | 52 | 59 | 86 | 57 |
| Compound Properties |  |  |  |  |
| Compound ML1 + 4@ 130° C. | 83 | 56 | 78 | 86 |
| 50° C. tan delta | 0.118 | 0.134 | 0.126 | 0.108 |
| 0° C. tan delta | 0.200 | 0.230 | 0.236 | 0.223 |
| M300 | 2020 | 1840 | 1960 | 2020 |
| T$_b$ (psi) | 2830 | 2410 | 2530 | 2960 |
| E$_b$ (%) | 389 | 378 | 364 | 401 |
| Lambourn Wear Index (65% slip) | 100 | 88 | 94 | 103 |

***Of SnCl$_4$
****Of TEOS
$^a$Added before SnCl$_4$

TABLE 3

Lab Physical Properties in Silica-filled Blended Rubber Formulation AA from Table 1A

| Example No. |  | 6 | 7 |  |  |
|---|---|---|---|---|---|
| Comparative Example No. | 5 |  |  | 6 | 7 |
| Polymer Used | F | A | D | G | H |
| Sn/Si Modification Ratio | 0/100 | 30/70 | 35/65 | 100/0 | 100/0 |
| Cl (of SnCL$_4$)/Li Ratio | 0 | 0.3 | 0.35 | 0.8 | 0.8 |
| Si (of TEOS)/Li Ratio | 0.6 | 0.5 | 0.61 | 0 | 0 |
| EHA/Li Ratio | 1 | 1 | 1 | 0 | 0 |
| Gum ML1 + 4 | 52 | 58 | 53 | 59 | 86 |
| Compound Property |  |  |  |  |  |
| 130° C. ML1 + 4 | 58 | 46 | 47 | 43 | 59 |
| 50° C. tan delta | 0.090 | 0.085 | 0.085 | 0.097 | 0.086 |
| M300 | 1690 | 1740 | 1750 | 1690 | 1710 |
| Tb (psi) | 2450 | 2260 | 2140 | 2080 | 2350 |
| Eb (%) | 1399 | 370 | 351 | 1367 | 390 |
| Lambourn 65% slip | 100 | 98 | 98 | 87 | 95 |

TABLE 4

Examples of Tire Test Data Using Carbon Black/Silica = 54/46 Tread Compound and Formulation BB from Table 1A

| Example No. |  |  | 8 |
|---|---|---|---|
| Comparative Example No. | 8 | 9 |  |
| Polymer type | H-Sn | N-TEOS | N-TEOS/Sn |
| Polymer used | J | F | D |
| Formulation Adjustments |  |  |  |
| Si-69 | 3 | 0 | 0 |
| Total Oil | 15 | 22.5 | 22.5 |
| Sulfur | 1.7 | 2.6 | 2.6 |
| Mixed Compound Property |  |  |  |
| ML1 + 4@ 130° C. | 57 | 74 | 63 |
| Tire Data | Standard |  |  |
| Rolling Resistance | 100 | 103 | 102 |
| Wet Traction | 100 | 100 | 101 |
| Dry Traction | 100 | 100 | 101 |
| Wear (20000 mile, Front) | 100 | 105 | 105 |

As clearly shown in Table 2, it can be understood that the elastomeric composition comprising the functionalized polymer represented by Examples 1 to 5 have excellent fracture properties, abrasion resistance, and low hysteresis loss (tan delta at 50° C.) without any adverse effects on wet grip (tan delta at 0° C.).

FIG. 1 displays the base polymer GPC data of the polymer of Example 1 before SnCl$_4$ coupling had occurred. The area (%) under P$_1$ is 91% with a peak molecular weight (M$_p$) of 107,000. The area (%) under P$_2$ is 9% with a peak molecular weight (M$_p$) of 235,000.

Figure 2:
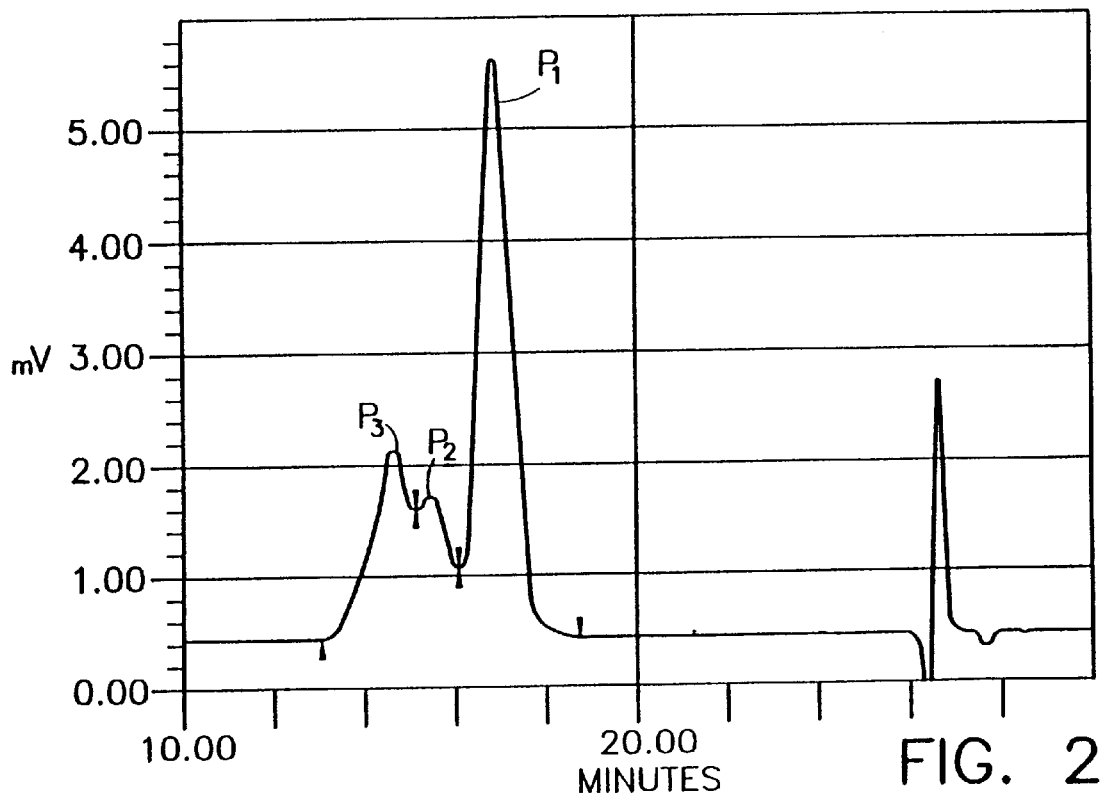
FIG. 2 is a graph showing the GPC curve which illustrates the molecular weight distribution of the polymer of Example 1 after $SnCl_4$ coupling.

FIG. 2 displays the polymer GPC data of the polymer of Example 1 after SnCl$_4$ coupling had occurred. The area (%) under P$_1$ is 56% with a peak molecular weight (M$_p$) of 111,000. The area (%) under P$_2$ is 12% with a peak molecular weight (M$_p$) of 240,000. The area (%) under P$_3$ is 32% with a peak molecular weight (M$_p$) of 399,000.

Figure 3:
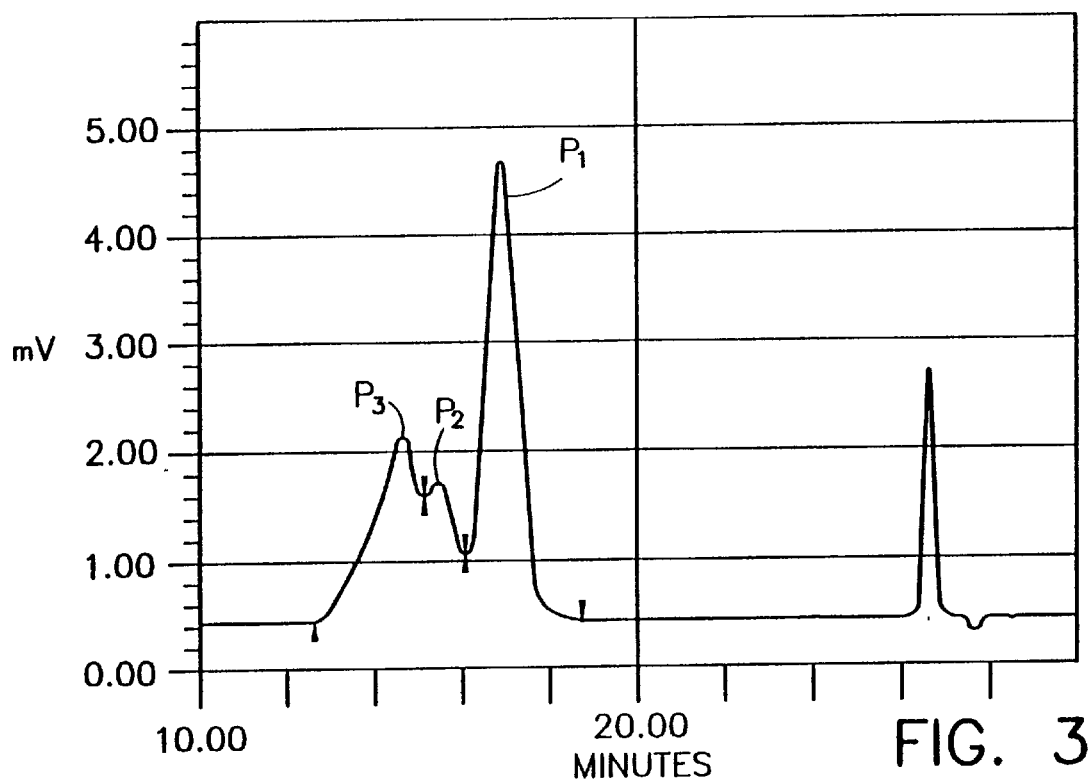
FIG. 3 is a graph showing the GPC curve which illustrates the molecular weight distribution of the polymer of Example 1 after sequentially coupling with $SnCl_4$ and then adding silane functionality by reaction with tetraethoxysilane (TEOS).

FIG. 3 displays the polymer GPC data of the polymer of Example 1 after both SnCl$_4$ and TEOS coupling had occurred sequentially. The area (%) under P$_1$ is 47% with a peak molecular weight (M$_p$) of 113,000. The area (%) under P$_2$ is 13% with a peak molecular weight (M$_p$) of 248,000. The area (%) under P$_3$ is 40% with a peak molecular weight (M$_p$) of 408,000.

Figure 4:
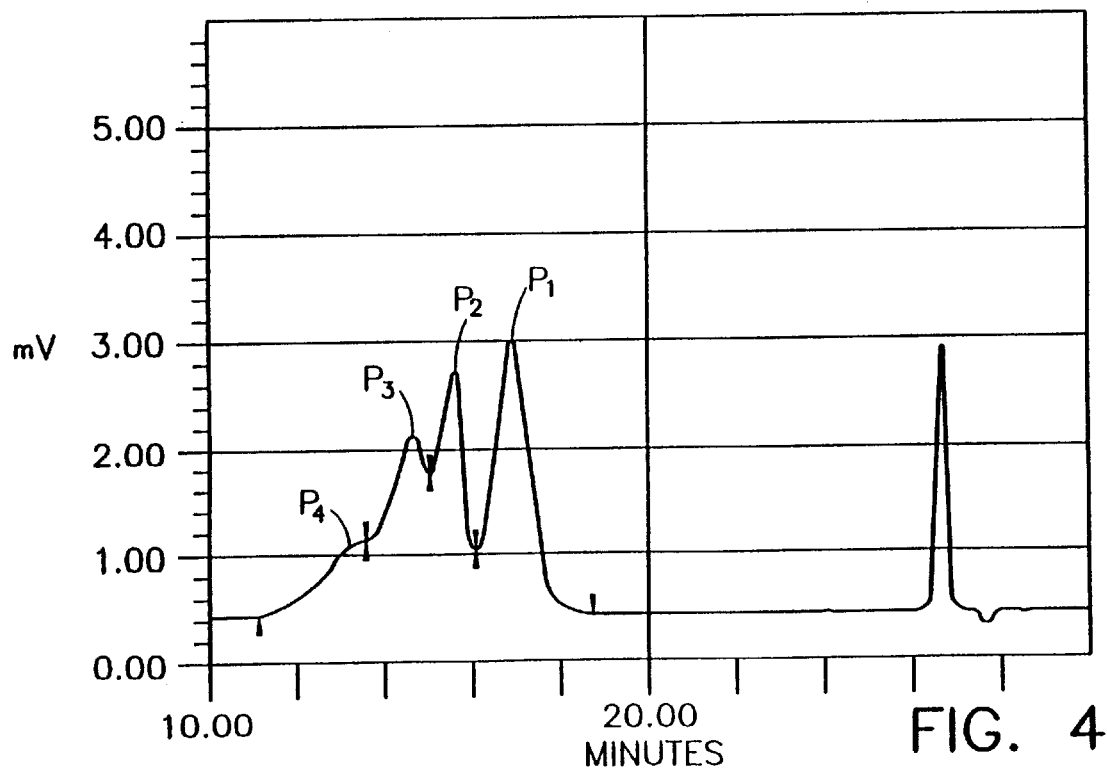
FIG. 4 is a graph showing the GPC curve which illustrates the molecular weight distribution of the polymer of Example 5 after contemporaneous coupling with $SnCl_4$ and adding silane functionality by reaction with tetraethoxysilane (TEOS).

FIG. 4 displays the polymer GPC data of the polymer of Example 5 after both SnCl$_4$ and TEOS coupling had occurred simultaneously. The area (%) under P$_1$ is 31% with a peak molecular weight (M$_p$) of 141,000. The area (%) under P$_2$ is 32% with a peak molecular weight (M$_p$) of 329,000. The area (%) under P$_3$ is 29% with a peak molecular weight (M$_p$) of 643,000. The area (%) under P$_4$ is 8% with a peak molecular weight (M$_p$) of 1,402,000.

Figure 5:
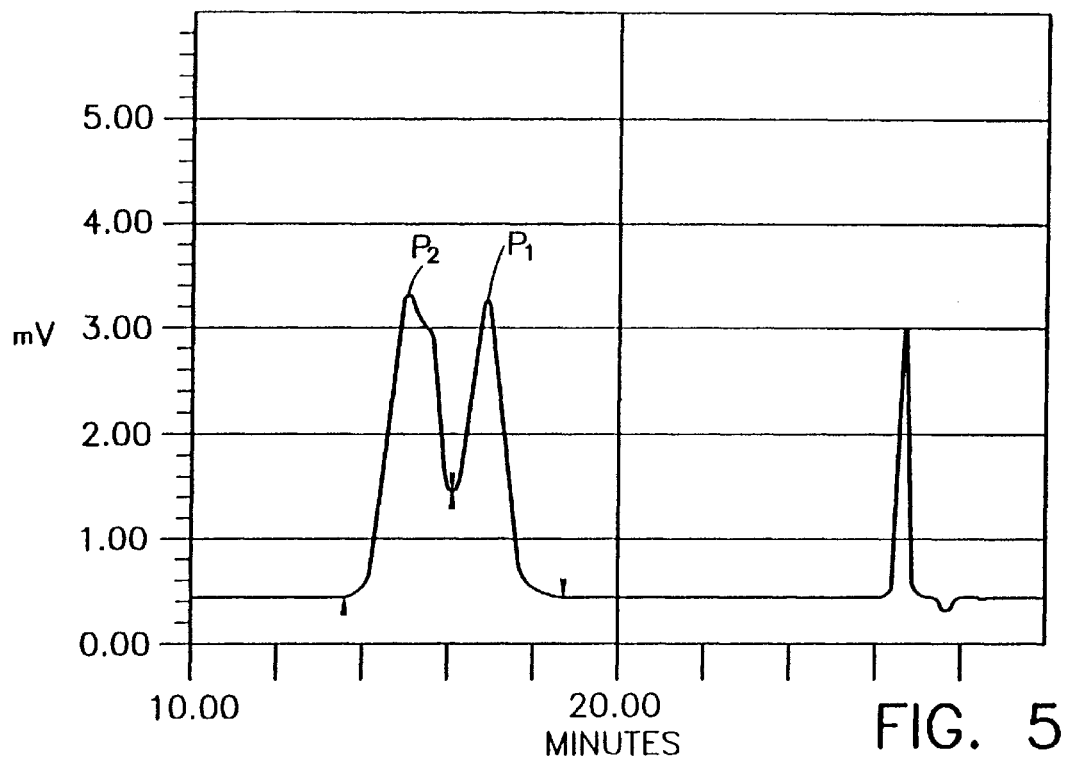
FIG. 5 is a graph showing the GPC curve which illustrates the molecular weight distribution of the polymer of Example 4 after sequentially coupling with $SnCl_4$ and then adding silane functionality by reaction with tetraethoxysilane (TEOS).

FIG. 5 displays the polymer GPC data of the polymer of Example 4 after both SnCl$_4$ and TEOS coupling had occurred sequentially. The area (%) under P$_1$ is 34% with a peak molecular weight (M$_p$) of 93,000. The area (%) under P$_2$ is 66% with a peak molecular weight (M$_p$) of 260,000.

Figure 6:
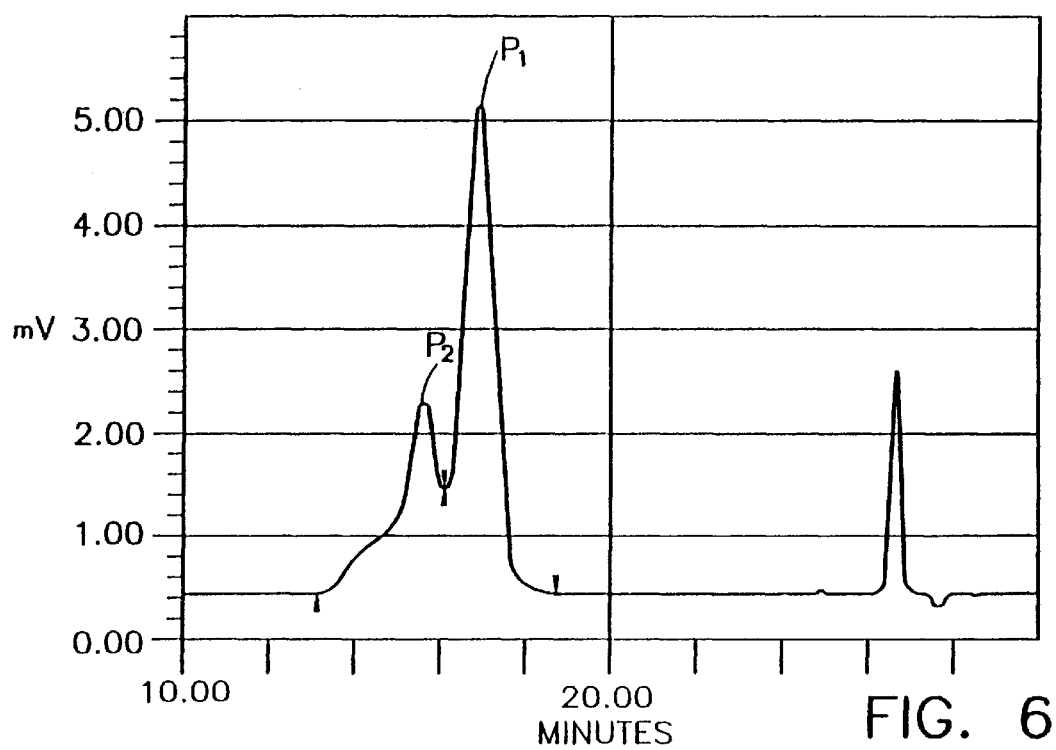
FIG. 6 is a graph showing the GPC curve which illustrates the molecular weight distribution of the $SnCl_4$ coupled and silane functionalized polymer of Example 4 after treatment with HCl to breakdown the Sn-C coupling bonds.

FIG. 6 displays the polymer GPC data of the polymer of Example 4 after both SnCl$_4$ and TEOS coupling had occurred sequentially and the coupled polymer had been treated with HCl to break down the Sn-C bonding in the Sn coupled portion of the polymer. The area (%) under P$_1$ is 59% with a peak molecular weight (M$_p$) of 104,000. The area (%) under P$_2$ is 41% with a peak molecular weight (M$_p$) of 214,000.

The effects of the elastomeric composition comprising the functionalized polymer can be more clearly seen by comparing the Compound ML 1+4 (with lower numbers being better) and other physical properties or tire properties of the examples and the comparative examples. The differences are apparent from: (1) the effect of the presence/absence of the functional group containing tin in the functionalized polymer (functional groups are present in the polymers of Examples 1 to 5 as compared with functional groups are absent in the polymer of Comparative Example 1) where the presence of the functional group containing tin in the functionalized polymer offers equivalent physical properties with reduced Compound ML 1+4 which exemplifies improved processability; (2) the effect of the presence/absence of the alkoxysilane group in the functionalized polymer (present in Examples 1 to 5 as compared with absent in Comparative Examples 2 to 3) where the presence of the alkoxysilane group in the functionalized polymer offers improved tan delta at 50° C. meaning lower rolling resistance, higher tensile strength ($T_b$) and improved Lambourn Wear Index; the combined effect of the presence/absence of the sequentially or simultaneously added functional groups containing tin and the alkoxysilane group in the functionalized polymer (present in Examples 1 to 5 as compared with alkoxysilane groups added prior to the tin coupling agent in Comparative Example 4) where the sequential or simultaneous addition of Sn and TEOS offers lower Compound ML 1+4, exemplifying improved processability, at the equivalent physical property level.

What is claimed is:

1. A method for preparing a diene polymer or copolymer useful in tire tread compositions containing a filler comprising the steps in sequence of:
   (a) preparing a living diene polymer or copolymer containing active organoalkali or organoalkaline earth metal terminals by anionically polymerizing a conjugated diene monomer or mixture of a conjugated diene monomer and vinyl aromatic hydrocarbon monomer in a hydrocarbon solvent using an organoalkali metal or organoalkaline earth metal initiator;
   (b) coupling from about 10 to about 70 percent by weight of the living diene polymer or copolymer chains by reacting the organoalkali or organoalkaline earth metal terminals thereof with from about 0.1 to about 0.7 equivalents of a tin polyhalide, based on the number of halogen atoms in said tin polyhalide, per mole of said living diene polymer or copolymer chains, said tin polyhalide having the general formula $R_a SnX_b$, wherein R is selected from the group consisting of alkyl, alkenyl, cycloalkyl and aryl groups, X is a halogen atom, a is an integer of 0–2, b is an integer of 2–4 and the sum of a+b=4; and
   (c) terminating the remaining living diene polymer or copolymer chains by reacting the organoalkali or organoalkaline earth metal terminals thereof with a hydrocarboxysilane compound.

2. The method of claim 1 wherein said living diene polymer or copolymer is a living polymer of butadiene or a copolymer of butadiene and styrene.

3. The method of claim 1 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methyldichlorostannyl) ethane, 1,4-bis (trichlorostannyl) butane and 1,4-bis (methyldichlorostannyl) butane.

4. The method of claim 1 wherein said tin polyhalide is tin tetrachloride.

5. The method of claim 1 wherein said tin polyhalide is dibutyldichlorotin.

6. The method of claim 1 wherein said hydrocarboxysilane compound is selected from the group consisting of tetraalkoxysilane compounds, alkylalkoxysilane compounds, arylalkoxysilane compounds, an alkenylalkoxysilane compounds, and halogenoalkoxysilane compounds.

7. The method of claim 1 wherein said hydrocarboxysilane compound is represented by the formula:

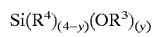

wherein $R^3$ and $R^4$ represent a group selected from an aliphatic hydrocarbon group, an alicyclic hydrocarbon group, or an aromatic hydrocarbon group, each group having 20 or less carbon atoms, and $R^4$ may be a halo group and y represents an integer of 1 to 4.

8. A diene polymer or copolymer composition comprising a mixture of:
   (a) from about 10 to about 70 percent by weight of a diene polymer or copolymer of a diene monomer and a vinyl aromatic hydrocarbon monomer containing carbon-tin bonds in the main polymer or copolymer chain; and
   (b) from about 90 to about 30 percent by weight of a diene polymer or copolymer of a diene monomer and a vinyl aromatic hydrocarbon monomer containing terminals formed by reacting living diene polymer or copolymer chains having organoalkali or organoalkaline earth metal terminals with a hydrocarboxysilane compound.

9. The composition of claim 8 wherein said diene polymer is polybutadiene.

10. The composition of claim 8 wherein said copolymer is a copolymer of butadiene and styrene.

11. The composition of claim 8 wherein said diene polymer or copolymer containing carbon-tin bonds is formed by coupling living diene polymer or copolymer chains by reacting the organoalkali or organoalkaline earth metal terminals thereof with a tin polyhalide having the general formula $R_a SnX_b$, wherein R is selected from the group consisting of alkyl, alkenyl, cycloalkyl and aryl groups, X is a halogen atom, a is an integer of 0–2, b is an integer of 2–4 and the sum of a+b=4.

12. The composition of claim 11 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methyldichlorostannyl) ethane, 1,4-bis (trichlorostannyl) butane and 1,4-bis (methyldichlorostannyl) butane.

13. The composition of claim 11 wherein said tin polyhalide is tin tetrachloride.

14. The composition of claim 11 wherein said tin polyhalide is dibutyldichlorotin.

15. The composition of claim 8 wherein said hydrocarboxysilane compound is selected from the group consisting of tetraalkoxysilane compounds, alkylalkoxysilane compounds, arylalkoxysilane compounds, an alkenylalkoxysilane compounds, and halogenoalkoxysilane compounds.

16. The compositions of claim 8 wherein said hydrocarboxysilane compound is represented by the formula:

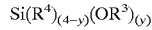

wherein $R^3$ and $R^4$ represent a group selected from an aliphatic hydrocarbon group, an alicyclic hydrocarbon group, or an aromatic hydrocarbon group, each group having 20 or less carbon atoms, and $R^4$ may be a halo group and y represents an integer of 1 to 4.

17. An elastomer composition adapted for use in forming the treads of tires having highly balanced wet traction, rolling resistance, ice and snow traction, and fracture property comprising:
   (a) from 20–100 percent by weight of a diene polymer or copolymer composition which comprises a mixture of:
      (i) from about 10 to about 80 percent by weight of a diene polymer or copolymer of a diene monomer and a vinyl aromatic hydrocarbon monomer containing carbon-tin bonds in the main polymer or copolymer chain; and
      (ii) from about 90 to about 20 percent by weight of a diene polymer or copolymer of a diene monomer and a vinyl aromatic hydrocarbon monomer containing terminals formed by reacting living diene polymer or copolymer chains having organoalkali or organoalkaline earth metal terminals with an hydrocarboxysilane compound selected from the group consisting of unsubstituted and substituted tetraalkoxysilane compounds, alkylalkoxysilane compounds, arylalkoxysilane compounds, an alkenylalkoxysilane compounds, and halogenoalkoxysilane compounds; and
   (b) from 0–80 percent by weight of a rubber selected from the group consisting of natural rubber, polybutadiene rubber, styrene-butadiene rubber and mixtures thereof.

18. The elastomer composition of claim 17 wherein the diene polymer of component (a) is polybutadiene.

19. The elastomer composition of claim 17 wherein the diene copolymer of component (a) is a copolymer of butadiene and styrene.

20. The elastomer composition of claim 17 wherein said diene polymer or copolymer containing carbon-tin bonds is formed by coupling living diene polymer or copolymer chains by reacting the organoalkali or organoalkaline earth metal terminals thereof with a tin polyhalide having the general formula $R_a SnX_b$, wherein R is selected from the group consisting of alkyl, alkenyl, cycloalkyl and aryl groups, X is a halogen atom, a is an integer of 0–2, b is an integer of 2–4 and the sum of a+b=4.

21. The elastomer composition of claim 20 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methyldichlorostannyl) ethane, 1,4-bis (trichlorostannyl) butane and 1,4-bis (methyldichlorostannyl) butane.

22. The elastomer composition of claim 20 wherein said tin polyhalide is tin tetrachloride.

23. The elastomer composition of claim 20 wherein said tin polyhalide is dibutyldichlorotin.

24. The elastomer composition of claim 17 wherein said said hydrocarboxysilane compound is represented by the formula:

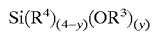

$$Si(R^4)_{(4-y)}(OR^3)_{(y)}$$

wherein $R^3$ and $R^4$ represent a group selected from an aliphatic hydrocarbon group, an alicyclic hydrocarbon group, or an aromatic hydrocarbon group, each group having 20 or less carbon atoms, and $R^4$ may be a halo group and y represents an integer of 1 to 4.

25. The elastomer composition of claim 17 wherein said hydrocarboxysilane compound is selected from the group consisting of tetraalkoxysilane compounds, alkylalkoxysilane compounds, arylalkoxysilane compounds, an alkenylalkoxysilane compounds, and halogenoalkoxysilane compounds.

26. The elastomer composition of claim 17 wherein said hydrocarboxysilane compound is selected from the group consisting of: tetramethoxysilane, tetraethoxysilane, tetra-n-propoxysilane, tetra-n-butoxysilane, tetra(2-ethylhexanoxy) silane, tetraphenoxysilane, tetratoluyloxysilane, methyltrimethoxysilane, methyltriethoxysilane, methyltri-n-propoxysilane, methyltri-n-butoxysilane, methyltriphenoxysilane, ethyltrimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane, γ-methacryloxy propyl trimethoxysilane, phenyltrimethoxysilane, phenyltriethoxysilane, phenyltri-n-propoxysilane, phenyltri-n-butoxysilane, phenyltriphenoxysilane, vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, styryltrimethoxysilane, trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, bis(trimethoxysilane)-ether, and (bis-(3-{triethoxysilyl}-propyl)-tetrasulfide).

27. An elastomer composition adapted for use in forming the treads of tires having highly balanced wet traction, rolling resistance, ice and snow traction, and fracture property comprising a rubber material comprising:
   (a) from 20–100 percent by weight of a diene polymer or copolymer composition which comprises a mixture of
      (i) from about 10 to about 80 percent by weight of a diene polymer or copolymer of a diene monomer and a vinyl aromatic hydrocarbon monomer containing carbon-tin bonds in the main polymer or copolymer chain; and
      (ii) from about 90 to about 20 percent by weight of a diene polymer or copolymer of a diene monomer and a vinyl aromatic hydrocarbon monomer containing terminals formed by reacting living diene polymer or copolymer chains having organoalkali or organoalkaline earth metal terminals with an hydrocarboxysilane compound selected from the group consisting of tetraalkoxysilane compounds, alkylalkoxysilane compounds, arylalkoxysilane compounds, an alkenylalkoxysilane compounds, and halogenoalkoxysilane compounds; and (b) from 0–80 percent by weight of a rubber selected from the group consisting of natural rubber, polybutadiene rubber, styrene-butadiene rubber and mixtures thereof; and a filler in an amount of 10 to 150 parts by weight based on 100 parts by weight of the rubber material, wherein the filler is selected from the group consisting of: white carbon, wet silica dry silica, calcium silicate aluminum silicate, clay, talc calcium carbonate, magnesium carbonate, hydrated alumina, diatomaceous earth barium sulfate, mica aluminum sulfate, titanium oxide, aluminum hydroxide, and aluminum oxide.

28. The elastomeric composition according to claim 27, wherein the filler is a white carbon and is present in the composition in an amount of 20 to 90 parts by weight based on 100 parts by weight of the rubber material.

29. The elastomeric composition according to claim 27, wherein the white carbon is silica.

30. The elastomer composition of claim 27 wherein the diene polymer of component (a) is polybutadiene.

31. The elastomer composition of claim 27 wherein the diene copolymer of component (a) is a copolymer of butadiene and styrene.

32. The elastomer composition of claim 27 wherein said diene polymer or copolymer containing carbon-tin bonds is formed by coupling living diene polymer or copolymer chains by reacting the organoalkali or organoalkaline earth metal terminals thereof with a tin polyhalide having the general formula $R_a SnX_b$, wherein R is selected from the group consisting of alkyl, alkenyl, cycloalkyl and aryl groups, X is a halogen atom, a is an integer of 0–2, b is an integer of 2–4 and the sum of a+b=4.

33. The elastomer composition of claim 32 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methyldichlorostannyl) ethane, 1,4-bis (trichlorostannyl) butane and 1,4-bis (methyldichlorostannyl) butane.

34. The elastomer composition of claim 32 wherein said tin polyhalide is tin tetrachloride.

35. The elastomer composition of claim 32 wherein said tin polyhalide is dibutyldichlorotin.

36. The elastomer composition of claim 27 wherein said said hydrocarboxysilane compound is represented by the formula:

$$Si(R^4)_{(4-y)}(OR^3)_{(y)}$$

wherein $R^3$ and $R^4$ represent a group selected from an aliphatic hydrocarbon group, an alicyclic hydrocarbon group, or an aromatic hydrocarbon group, each group having 20 or less carbon atoms, and $R^4$ may be a halo group and y represents an integer of 1 to 4.

37. The elastomer composition of claim 27 wherein said hydrocarboxysilane compound is selected from the group consisting of tetraalkoxysilane compounds, alkylalkoxysilane compounds, arylalkoxysilane compounds, an alkenylalkoxysilane compounds, and halogenoalkoxysilane compounds.

38. The elastomer composition of claim 27 wherein said hydrocarboxysilane compound is selected from the group consisting of: tetramethoxysilane, tetraethoxysilane, tetra-n-propoxysilane, tetra-n-butoxysilane, tetra(2-ethylhexanoxy) silane, tetraphenoxysilane, tetratoluyloxysilane, methyltrimethoxysilane, methyltriethoxysilane, methyltri-n-propoxysilane, methyltri-n-butoxysilane, methyltriphenoxysilane, ethyltrimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane, γ-methacryloxy propyl trimethoxysilane, phenyltrimethoxysilane, phenyltriethoxysilane, phenyltri-n-propoxysilane, phenyltri-n-butoxysilane, phenyltriphenoxysilane, vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, styryltrimethoxysilane, trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, bis(trimethoxysilane)-ether, and (bis-(3-{triethoxysilyl}-propyl)-tetrasulfide).

* * * * *